United States Patent [19]

Edwards

[11] 4,431,025
[45] Feb. 14, 1984

[54] BACK FLOW PREVENTION VALVE

[76] Inventor: Lawrence H. Edwards, 3102 5th Ave. North, Lethbridge, Alberta T1J 4A2, Canada

[21] Appl. No.: 341,393

[22] Filed: Jan. 21, 1982

[30] Foreign Application Priority Data

Dec. 3, 1981 [CA] Canada .................................. 391416

[51] Int. Cl.³ ........................ F16K 31/18; F16K 33/00
[52] U.S. Cl. .................................... 137/422; 137/451
[58] Field of Search ................ 137/434, 451, 422, 445

[56] References Cited

U.S. PATENT DOCUMENTS

| | | | |
|---|---|---|---|
| 236,311 | 1/1881 | Doherty | 137/441 |
| 633,180 | 9/1899 | Amodeo-Salvator | 137/445 |
| 1,047,863 | 12/1912 | Wall | 137/445 |
| 1,212,056 | 1/1917 | Hill | 137/451 |
| 1,338,179 | 4/1920 | Hohmeister | 137/451 |
| 1,637,444 | 8/1927 | Eustis | 137/422 |
| 1,639,997 | 8/1927 | Haas | 137/426 |
| 1,657,658 | 4/1927 | Buford | 137/425 |
| 1,709,678 | 4/1929 | Miller | 137/445 |
| 2,324,084 | 7/1943 | Horner | 137/218 |
| 3,153,422 | 10/1964 | Marsee et al. | 137/434 |
| 3,363,643 | 1/1968 | Skulski | 137/445 |
| 3,853,141 | 12/1974 | Fischer | 137/151 |
| 4,122,862 | 10/1978 | Brandelli | 137/451 |
| 4,243,070 | 1/1981 | Jackson | 137/510 |

FOREIGN PATENT DOCUMENTS

| | | |
|---|---|---|
| 153802 | 2/1914 | Canada . |
| 274366 | 10/1927 | Canada . |
| 318557 | 1/1932 | Canada . |
| 360455 | 9/1936 | Canada . |
| 695225 | 9/1964 | Canada . |
| 819473 | 8/1969 | Canada . |

*Primary Examiner*—George L. Walton
*Attorney, Agent, or Firm*—Charles W. Fallow; Martin P. Hoffman; Mitchell B. Wasson

[57] ABSTRACT

There is disclosed a float-responsive valve of the type used in cisterns. Lost motion connection means are provided between the float and the valve, so that in the event of a drop of water pressure in the line supplying the valve, a resilient means overrides the action of the float to seat the valve and prevent siphoning of water from the system back into the water supply system. The construction is simple, using a minimal number of parts, and is easily maintained.

4 Claims, 2 Drawing Figures

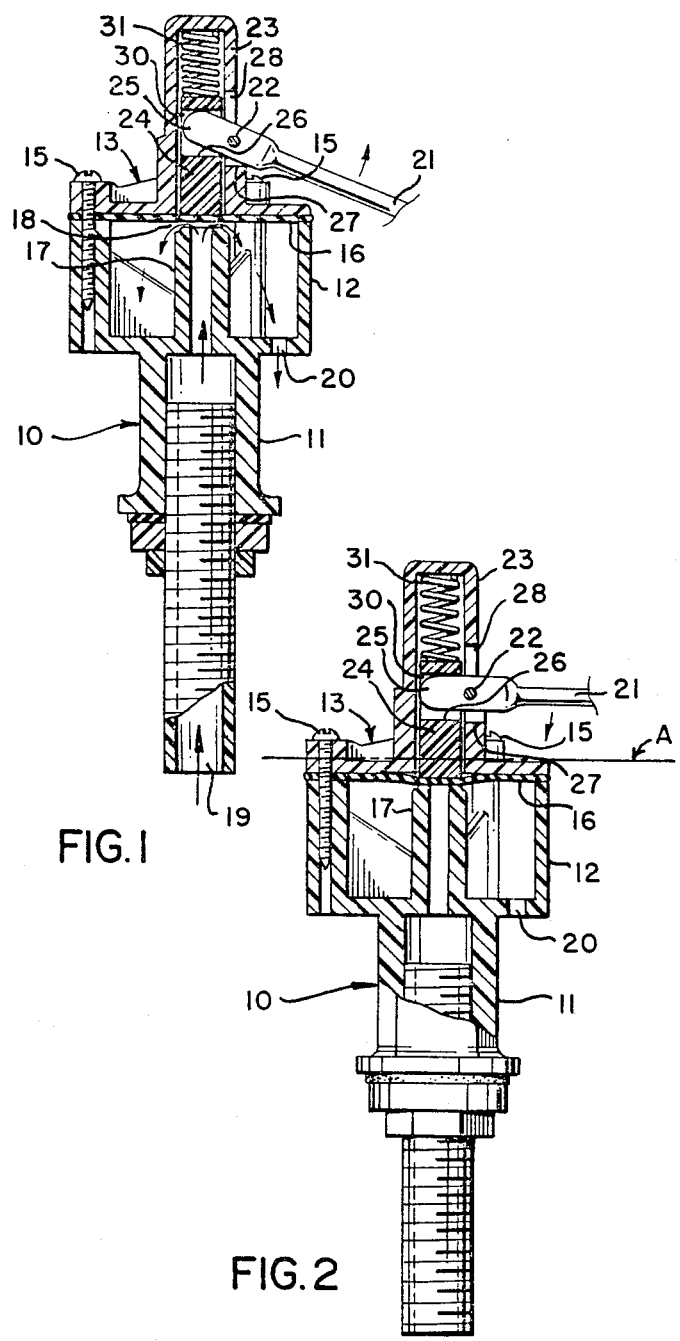

BACK FLOW PREVENTION VALVE

FIELD OF THE INVENTION

This invention relates to reservoir valves, and more particularly, to reservoir valves with anti-siphoning means.

DESCRIPTION OF THE PRIOR ART

In most applications, water supply lines leading to taps, drinking fountains, toilets and other services ar connected to a common main, and water held in small storage tanks, for example in toilet cisterns, is capable of being siphoned out and back into the water supply lines in the event of a lowering of pressure, or a total loss of pressure, in the supply line. If captive water in a cistern is capable of being siphoned back into the main supply line, and especially if the cistern is subject to contamination, serious health problems can arise if the water, once siphoned back into the supply line, then is discharged through a tap used for drinking water. This problem would be especially serious in the event that the main supply line for the water were used, for example, for a cattle feeding trough controlled by a level responsive valve. In that event, seriously contaminated water could return to the supply lines and thus into the drinking water supply.

Attempts have been made to solve the above problem by installing a check valve in each cistern or water tank. However, for many applications such check valves involve not only additional moving parts, but extra expense both in the provision of the check valve and in its installation.

One example of an attempt to solve the problems outlined above is taught in U.S. Pat. No. 3,853,141, dated Dec. 10,1974 and granted to Edward J. Fischer. The Fischer system involves the use of two separate anti-back flow valves, one associated with the conventional float responsive valve and a second, ball type valve, upstream of the conventional valve.

Cisterns involving constructions such as the Fischer valve must be more expensive than valves that are not so equipped, and frequently involve additional installation steps and, perhaps more important, require more maintenance in that any malfunction would necessitate the disassembly of substantial numbers of parts. The present invention seeks to overcome the difficulties of the prior art by providing an anti-back flow valve with a minimum number of working parts, that can be easily and cheaply constructed, and that is easy to maintain and in fact no more difficult to maintain than a valve that is not equipped with anti-back flow means.

SUMMARY OF THE INVENTION

As with most other cistern valves, the present invention includes a valve that is forced against its seat by a float attached to a lever, with the float rising with the water level to force the valve against its seat and sinking as the water level sinks to release the valve from its seat and thus admit flow of water into the tank that is being supplied. The invention differs from the prior art in that, between the lever and the valve, there is provided a lost motion connection, and spring loading means for forcing the valve against its seat. In normal use, if the float drops below a certain level the water pressure in the system forces the valve off its seat to fill the tank, and the rising water level in the tank lifts the float means, and operates the lever to force the valve against its seat. However, in the event that water pressure is lost in the system, the spring in combination with the lost motion connection overrides the operation of the lever and float and forces the valve against its seat. This prevents siphoning of water out of the system and effectively closes the valve until water pressure is restored.

The above construction preferably is used with a diaphragm valve, with the diaphragm being urged against the valve seat by a plunger, the plunger itself containing the means for providing the lost motion connection.

Very few moving parts are used in the system, and most parts can be constructed of materials that are highly resistant to corrosion, such as thermo-plastics including nylon.

In the accompanying drawings, which illustrate an embodiment of the invention;

BRIEF DESCRIPTION OF THE DRAWING

FIG. 1 is a partial section of a valve constructed according to the present invention, and FIG. 2 is a view like FIG. 1 showing the valve urged against its seat in the absence of water pressure.

DESCRIPTION OF THE PREFERRED EMBODIMENT

In the drawings, FIG. 1 shows a valve body 10 comprising a relatively narrower cylindrical portion 11 and a widened cylindrical portion 12. A cap 13 is secured by suitable corrosion resistant screws 15 to the portion 12 of the body, with three such screws preferably being used. Between the cap 13 and portion 12 of the body 10, there is sandwiched a diaphragm 16. Centrally disposed in portion 12 is a valve seat 17 which suitable may be formed integral with the valve body 10 and extends upwardly so that, when assembled, and when the diaphragm 16 is in its rests position, a small space 18, in the order of 0.09" is provided through which the water may flow from the inlet 19, around the valve seat 18, and through a number of holes 20 provided in the bottom of the portion 12. The above described components are secured to a cistern (not illustrated) by suitable threaded connections as is well known in the art.

A lever 21 is pivoted at fulcrum 22 to an upwardly extending cylindrical housing 23 having a notch 28 to accommodate the lever 21, the housing being formed intergrally with the cap 13. The cylindrical housing 23 is coaxial with the upstanding portion 17 and contains a plunger element 24. It will be appreciated that the lever 21 pivots about the fulcrum 22 and when the cistern is full, the distal end 25 of lever 21 presses against surface 26 to urge the plunger 24 downward against the diaphragm 16 and in turn to force the latter against the seat 18. Thus, when the tank is full, water is prevented from flowing through the inlet 19, past the valve seat 18 and into the cistern. In response to a drop in water level, the lever 21 pivots downwardly, the distal end 25 lifts off the surface 26, and a combination of the water pressure in the system and the natural resilience of the diaphragm 16 permits water to flow into the cistern, until it is full, in which event the cycle described above is repeated.

So much is prior art. Where the present embodiment differs from the prior art is in the provision of a slot 30 in the plunger 24 which is larger than the distal end 25 of the lever 21. This does not affect the normal operation of the valve. However, in the event that water pressure is lost in the line 19, and in the event that the cistern is not full or that water is drawn from it, the size of the slot 30 permits the effective disassociation of the distal end 25 of lever 21 and the plunger 24. A spring 31 then comes into effect and forces the plunger 24 downwardly and in turn forces the diaphragm 16 against the seat 17, as shown in FIG. 2 where the water level is shown at A: that is, above holes 20 and seat 17. Then, no matter what level is assumed by the water in the cistern, the spring 31 will bias the plunger 24 downward and close the valve until water pressure is restored in which event the normal operation of the valve resumes. Stop 27 on housing 23 prevents lever 21 from lifting the plunger 24 to release the diaphragm 16 from seat 17 in the absence of water pressure. The stop 27 is preferably the lower end of the notch 28.

FIG. 2 illustrates the typical position of the elements during a lower water pressure period or during a period when there is no water pressure whatsoever in the line 19. The water level has sunk below the "valve closed" position so that the distal end 25 no longer bears against surface 26 to force the valve against its seat. However, spring 31 has forced the plunger 24 downwardly, overcoming the bias of the diaphragm 16, which latter element is forced against the seat 18. Thus, even though the water level A in the cistern is above the holes 20, water cannot be siphoned past the element 18 and out of the tank.

It will be seen that compared with similar systems, the only additional component described above is the spring 31 and only a minor modification has been made in the lever 21 and in the plunger 24 to achieve the desired end of providing an anti-back flow valve. As a result, considerable economies can be realized in the construction of back flow prevention means, installation can be carried out by unskilled persons with relative ease, and maintenance of the system can be carried out similarly by unskilled persons since easy access to the interior of the whole assembly can be gained from about the valve, unlike other systems where complete removal of the system had to be effected before repairs could be carried out.

What I claim as my invention is:

1. In a float-responsive valve of the type used for establishing a desired fluid level in a tank, and comprising a valve seat, a valve element for cooperating with the valve seat, lever means having a fulcrum adjacent the valve element, and float means on the lever means responsive to fluid level to operate the lever to close the valve when the tank is full, said float being movable between upper and lower limits, the improvement comprising a lost-motion connection between the float lever and the valve element, said connection having sufficient lost motion to prevent said float lever from forcing said valve open at any position of said float, and resilient means biasing the valve towards its seat, whereby in the absence of fluid pressure the resilient means forces the valve element against the seat and prevents siphoning of fluid from the tank through the valve regardless of the position of said float and the float comes into play only in further closing the valve when the fluid level reaches its desired level and the float is at its upper limit.

2. The float responsive valve defined in claim 1 wherein the valve element is a diaphragm valve.

3. The float responsive valve defined in claim 1 or 2 wherein the valve element is urged against its seat by a plunger and wherein the lost motion connection comprises a slot in said plunger, said lever having an end remote from the float means engaging in the slot, the slot being larger than the remote end of the lever to provide said lost motion connection.

4. The float responsive valve defined in claim 3 wherein the resilient element is a compression spring.

* * * * *